W. WRIGHT.
COMPUTING MACHINE.
APPLICATION FILED MAR. 9, 1912.

1,261,336.

Patented Apr. 2, 1918.
2 SHEETS—SHEET 1.

Witnesses:

Inventor
Walter Wright
by his Attorney

W. WRIGHT.
COMPUTING MACHINE.
APPLICATION FILED MAR. 9, 1912.

1,261,336.

Patented Apr. 2, 1918.
2 SHEETS—SHEET 2.

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMPUTING-MACHINE.

1,261,336.     Specification of Letters Patent.     Patented Apr. 2, 1918.

Application filed March 9, 1912. Serial No. 682,696.

*To all whom it may concern:*

Be it known that I, WALTER WRIGHT, a citizen of the United States, residing in New York city, in the county of New York and State of New York, have invented certain new and useful Improvements in Computing-Machines, of which the following is a specification.

This invention relates to computing machines and is herein disclosed as applied to a computing head of the master wheel type in which computing wheels are turned *seriatim* by a master wheel.

In machines as heretofore built, elaborate devices have been frequently employed for throwing a carry-over mechanism into and out of operative connection with dial or computing wheels, and strong spring detents have been frequently employed for alining the parts. In other machines many small loose parts have been employed, difficult to assemble, and liable to get out of adjustment.

The present invention is designed to avoid difficulties due to such and other constructions and is substantially shown as an improvement on co-pending applications No. 642,183, filed August 3, 1911, and No. 682,334, filed Mar. 8, 1912.

In said applications, computing wheels are disclosed which are each built in two parts, one of which is driven by the master wheel, while the other or main part is engaged with a carry-over mechanism. Means are provided for coupling the two parts together so that the carry-over mechanism may turn the whole computing wheel; or the two parts may be disconnected, so that the carry-over mechanism operates on the idle part of it while the master wheel drives the main part.

In the present invention this coupling device is preferably in the form of an external gear wheel which meshes with peripheral teeth on the two parts of the computing wheel and therefore causes them to move together, the said external wheel being an idle wheel.

These external idle wheels are preferably mounted each on an arm pivoted on the frame of the machine, and from said arm extends preferably another arm which is moved by a cam member, traveling relatively to the arm, so as to swing each external idle wheel in turn away from the parts of the computing wheels. When the coupling wheel swings out of mesh with its computing wheel, the two parts of said computing wheel with which it meshes may revolve idly on each other. For each of these arms a spring is preferably provided holding the coupling wheel against the computing wheels. When the coupling wheel swings outwardly, it preferably engages with an arm which enters between its teeth so that it cannot turn on its pivot but will positively mesh with the teeth on the computing wheel when it is returned by its spring. The computing wheels are connected together by Geneva lock carry-over wheels, with the result that by these wheels and the couplers, a continuous train is formed. Each dial wheel may be geared to its computing wheel by an idle gear.

The carry-over mechanism is preferably so built that each computing wheel is either positively driven or positively locked by said carry-over mechanism from the adjoining lower computing wheel. The units computing wheel, which has no carry-over mechanism to lock it, is preferably provided with a positive lock operated in a manner similar to the couplers.

Other features and advantages will hereinafter appear.

In the accompanying drawings.

Figure 1:
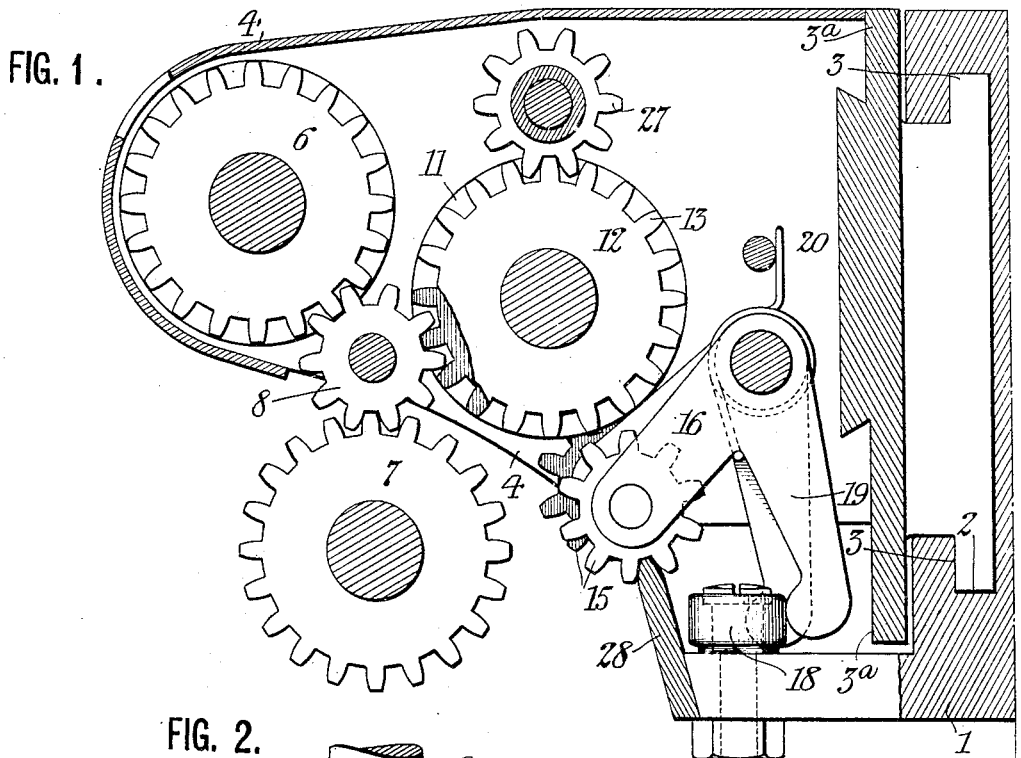
Figure 1 is a section through a computing head, showing my invention as applied thereto.
Figure 2:
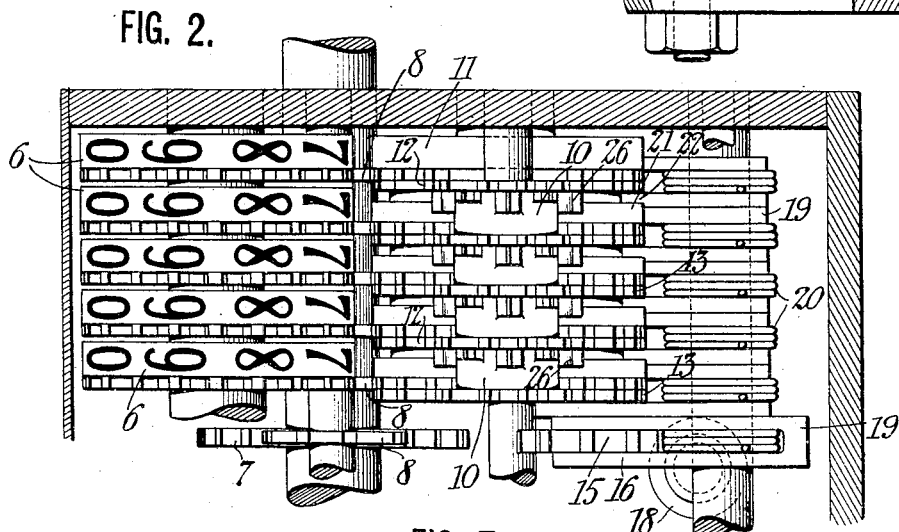
Fig. 2 is a plan view of the mechanism in the same.

The invention is herein disclosed as applied to an Underwood typewriting machine, in which 1 represents the front of a typewriter on which are formed channels 2 and in which ride arms 3 on a totalizer carriage 3ª, which carries a totalizer 4. In said totalizer dial wheels 6 are turned by a master wheel 7 through intermediate gears 8, there being one intermediate gear for each dial wheel and one master wheel for the computing head. Said intermediate wheels 8 also drive computing wheels 9 on which operate carry-over wheels 10. Each computing wheel is formed with a main body 11 and a loose gear 12, which loose gear is adjacent the computing wheel next lower in denomination. Teeth 13 on the periphery of said loose gear 12 are formed equal in number to teeth 14 on said body 11, and the loose gear and main body may be compelled to rotate as a unit by a coupling wheel 15 carrying teeth arranged to mesh with both teeth 13 and 14 and to be driven idly by either of them. Said coupling wheel is mounted as an idle wheel on a rock arm 16, so that the coupling wheel may be moved into and out of mesh with said computing wheel.

In the form herein illustrated, the computing head is shown as traveling along the front of the typewriter past a master wheel 7 which is mounted in fixed journals in the machine. A cam roller 18 also fixed in the typewriting machine is arranged to successively strike bell cranks 19 fast to the arms 16 and carry the coupler wheels 15 on said arms successively out of mesh with the computing wheels, so that the computing wheel, which is being operated by the master wheel, may turn idly with respect to its loose wheel. Thus it is impossible for the parts to be locked against movement, and since the carry-over wheel drives exclusively by means of this loose gear, it is impossible for the carry-over wheel meshing with this loose gear, to carry any motion back to the gear wheels lower in denomination. A spring 20 returns each bell crank 19 to normal position when it is not engaged by said cam roller 18.

The main portion of each computing wheel is formed with a smooth periphery 21 which is cut away to form a ledge 22, and in the depression formed by this ledge ride thin teeth 23 on said carry-over wheel. Extending from said ledge are formed two teeth 24 which are arranged to intercept said teeth 23 and turn said carry-over wheel once in every revolution of the computing wheel. Between the two teeth 24 just mentioned a notch 25 is formed, into which a broad tooth 26 on said carry-over wheel can sink when said carry-over wheel is being turned by tooth 24. Said broad teeth 26 normally ride on the periphery 21 of said computing wheel and form a Geneva lock for the carry-over wheel unless it is being turned by the computing wheel. The carry-over wheel is therefore positively locked or positively driven by a computing wheel. Each carry-over wheel is formed as a unit and carries teeth 27 which mesh with the loose member 12 of the computing wheel next higher in denomination.

Figure 4:
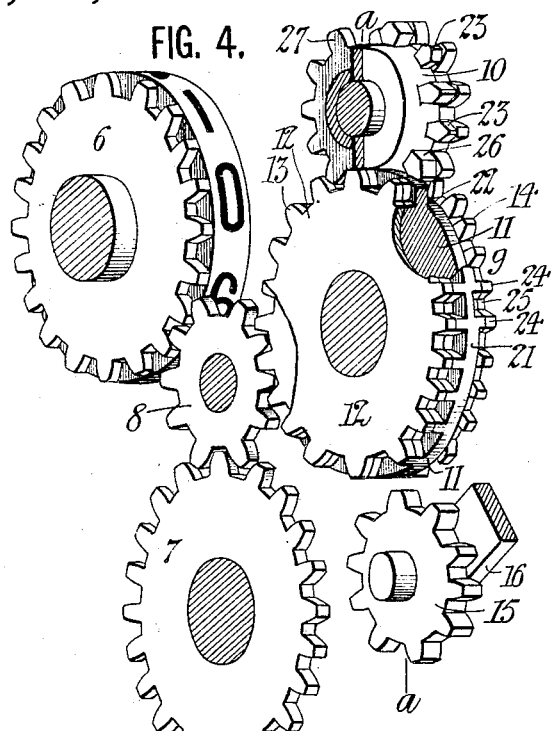
Fig. 4 is a perspective view, showing a computing wheel and its related parts.
Figure 5:
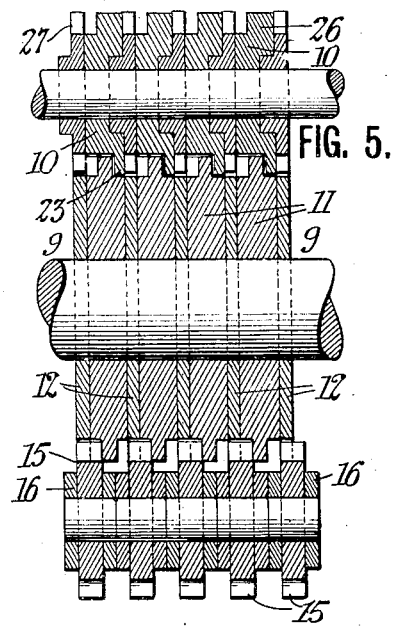
Fig. 5 is a section on line *a—a* of Fig. 4.

In Fig. 4, the shaded portion of the carry-over mechanism at the left above the computing wheel is part of a carry-over wheel operated by a computing wheel (not shown) to the left of the one shown in said figure. The loose gear 12 at the right of the said figure showing just beyond the computing wheel 11 is arranged to be locked to the computing wheel not shown beyond it by a coupler (also not shown) in said figure. All of said parts not shown are identical with the similar parts shown in the figure. As there is one pair of teeth 24 and one depression 25 on each computing wheel, each computing wheel is operated once in every revolution of the wheel lower in denomination, thus making a carry-over. Said carry-over is arranged to take place every time the lower computing wheel drives past zero.

Figure 3:
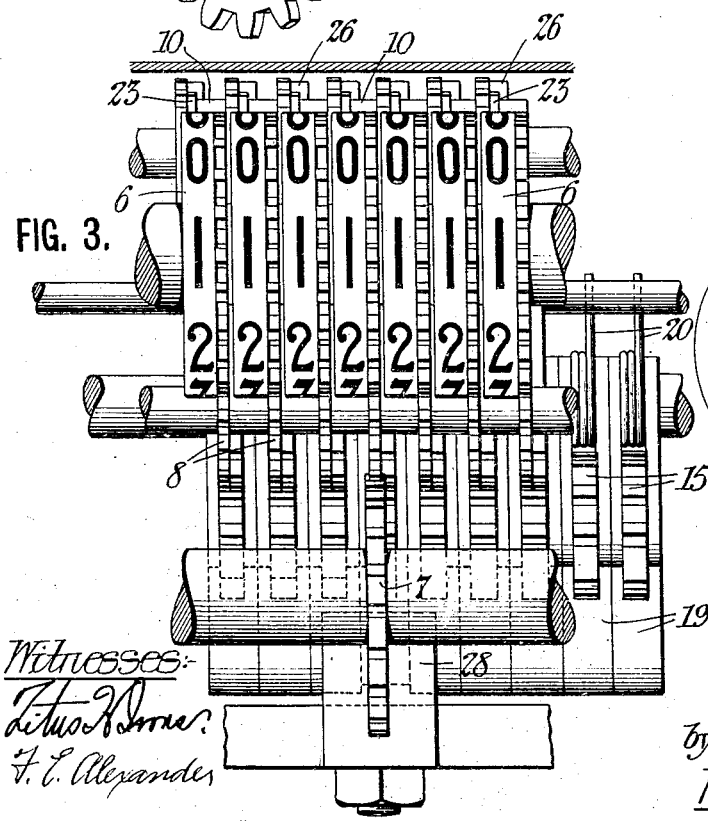
Fig. 3 is a front elevation of the mechanism.
Figure 6:
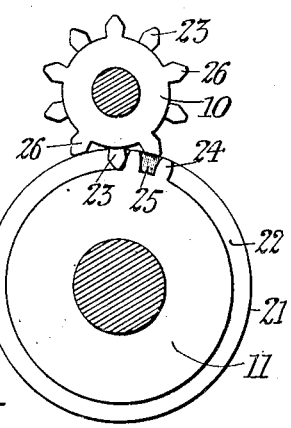
Fig. 6 is a view of a computing wheel at the moment the carry-over wheel is being turned by it.

The coupling wheels 15 are arranged to strike a plate 28 as they swing outwardly. Said plate is adjacent to master wheel 7, as seen in Figs. 1 and 3, and is so placed that the teeth in every coupling wheel, as it swings outwardly, are in mesh either with teeth 13 on the computing wheel or with said plate 28. It is therefore impossible for the coupling wheel to fail to mesh with its computing wheel when it swings against it.

Figure 7:
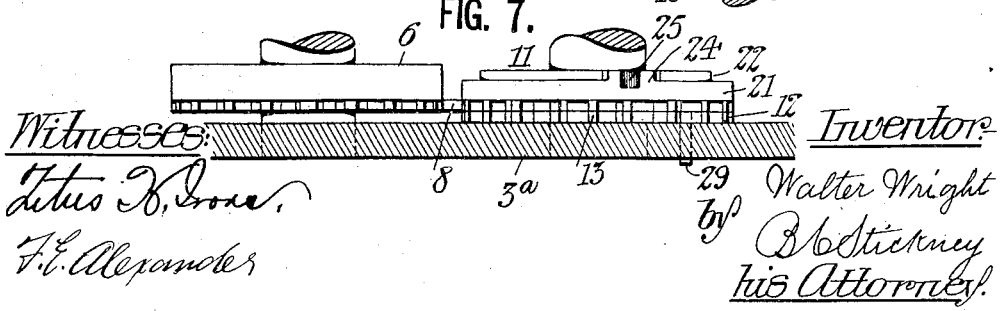
Fig. 7 is a section through the end of a computing head, showing means for locking the units wheel.

In order to lock the units wheel (which of course is never operated by a carry-over wheel) the coupling wheel 15 for said units wheel is arranged to mesh with a tooth fixed on the wall of the totalizer at the same time that it meshes with the computing wheel. Said fixed tooth is shown in Fig. 7 as a wheel precisely like the loose wheels 11 except that it is held fixed to said wall by means of a pin 29. When the coupling wheel for said units wheel is in mesh with the units wheel, it is also in mesh with the gear wheel held fixed by said pin, and therefore the units wheel normally cannot move.

The operation may be summed up as follows:

If the computing head is attached to a typewriter carriage, it will travel along inoperative until the highest wheel in denomination meshes with the master wheel 7. At this moment the coupler 15 for the computing wheel governed at the moment by the master wheel is swung outwardly by means of cam roller 18. A numeral key may be then depressed in the typewriter keyboard, and the master wheel 7 will be rotated to an extent governed by the key depressed, thus rotating the computing and dial wheels. When the key is released, the escapement will feed forward the typewriter carriage and move the computing head with it so that the master wheel engages with the next computing wheel. The coupling device in mesh with that computing wheel is meanwhile moved out of mesh, and the coupling device for the wheel previously operated is swung back by its spring 20. A numeral key is then depressed and the same operation thus repeats itself. Meantime, the first computing wheel is held locked by the Geneva lock which the carry-over wheel meshing with it forms with the computing wheel just being operated. But if the number computed, requires a dial wheel to be rotated past zero, the computing wheel's tooth 24 will strike the thin tooth 23 upon the carry-over wheel, and turn said carry-over wheel, causing its broad tooth 26 which has been forming the Geneva lock with the periphery of the computing wheel to sink into and rise out of the depression 25. The teeth 26 on said carry-over wheel meantime are turning the adjoining loose gear 12, and through it the computing wheel and dial wheel are driven. After the carry-over is completed, the carry-over wheel is again locked by its broad teeth 26.

It will be noted that the mechanism shown in this invention can be built with a very small number of wheels and that a wide space is left on the dial wheels upon which the numerals may be placed. Further, there are few parts to get out of order, there is little inertia to be overcome if the mechanism is key-driven, and so far as the computing mechanism is concerned, there are preferably no reciprocating parts to be started and arrested by the keys. Also since all wheels may be operated by peripheral gears if desired, all wheels are preferably supported on fixed idle shafts. This mechanism is especially adapted to be used in combined typewriting and computing machines, but may be advantageously employed in other machines.

Variations may be resorted to within the scope of the invention, and portions of the improvements may be used without others.

Having thus described my invention, I claim:

1. The combination, with a plurality of computing wheels, and a master wheel for driving them; of a carry-over mechanism; a loose gear associated with each computing wheel and disposed co-axially therewith, said gears driven by said carry-over mechanism; an individual coupling device normally engaging each computing wheel and its associated gear to lock them together; and a releasing device for moving the successive couplers bodily, one after another, out of such engagement, to permit the computing wheel driven by the master wheel to turn idly with relation to its gear.

2. The combination, with a plurality of externally-toothed computing wheels, and a master wheel for driving them; of an externally-toothed loose gear associated with each computing wheel and disposed co-axially therewith; a carry-over mechanism engaging said gears; a toothed coupler individual to each computing wheel and its associated gear, and normally engaging the teeth thereof, to lock said wheel and gear together; and means for moving the successive couplers bodily, one after another, out of such engagement, to permit the computing wheel driven by the master wheel to turn idly with relation to its gear.

3. The combination, with a plurality of computing wheels, and a master wheel for driving them; of a carry-over mechanism; a loose gear associated with each computing wheel and disposed co-axially therewith, said gears driven by said carry-over mechanism; a pivotally-mounted coupler individual to each computing wheel and its associated gear and normally engaging the same to lock them together; and means for swinging the successive couplers bodily, one after another, out of such engagement, to permit the computing wheel driven by the master wheel to turn idly with relation to its gear.

4. The combination, with a plurality of computing wheels, and a master wheel for driving them; of a carry-over mechanism; a loose gear associated with each computing wheel and disposed co-axially therewith, said gears driven by said carry-over mechanism; a pivotally-mounted coupler individual to each computing wheel and its associated gear and normally engaging the same to lock them together; and a single releasing element arranged to engage and swing the successive couplers bodily, one after another, out of such engagement, to permit the computing wheel driven by the master wheel to turn idly with relation to its gear.

5. The combination, with a plurality of computing wheels, and a master wheel for driving them; of a carry-over mechanism; a loose gear associated with each computing wheel and disposed co-axially therewith, said gears driven by said carry-over mechanism; a pivotally-mounted coupler individual to each computing wheel and its associated gear and normally engaging the same to lock them together; and a cam arranged to engage and swing the successive couplers bodily, one after another, out of such engagement, to permit the computing wheel driven by the master wheel to turn idly with relation to its gear.

6. The combination, with a plurality of externally-toothed computing wheels, a master wheel for driving said computing wheels, and a traveling carriage providing relative traverse therebetween; of an externally-toothed loose gear associated with each computing wheel and disposed co-axially therewith; a carry-over mechanism engaging said gears; a toothed coupler individual to each computing wheel and its associated gear and normally engaging the teeth thereof, to lock said wheel and gear together; and releasing means controlled by the travel of said carriage for moving the successive couplers bodily, one after another, out of such engagement, to permit the computing wheel driven by the master wheel to turn idly with relation to its gear.

7. The combination, with a plurality of externally-toothed computing wheels, and a master wheel for driving them, said computing wheels and master wheel having relative travel; of an externally-toothed loose gear associated with each computing wheel and disposed co-axially therewith; a carry-over mechanism engaging said gears; a toothed coupler individual to each computing wheel and its associated gear and normally engaging the teeth thereof, to lock said wheel and gear together, said couplers fixed with relation to said computing wheels and gears; and a releasing device, fixed with relation to said master wheel, for moving the successive couplers bodily, one after another, out of such engagement, to permit the computing wheel driven by the master wheel to turn idly with relation to its gear.

8. The combination, with a plurality of computing wheels, and a master wheel for driving them; of a carry-over mechanism; a loose gear associated with each computing wheel and disposed co-axially therewith, said gears driven by said carry-over mechanism; a coupler individual to each computing wheel and its associated gear and normally engaging the same, to lock them together; and a roller arranged to engage and move the successive couplers bodily, one after another, out of such engagement, to permit the computing wheel driven by the master wheel to turn idly with relation to its gear.

9. The combination, with a plurality of computing wheels, and a master wheel for driving them; of a carry-over mechanism; a loose gear associated with each computing wheel and disposed co-axially therewith, said gears driven by said carry-over mechanism; a coupler individual to each computing wheel and its associated gear and normally engaging the same, to lock them together; a plurality of pivotally-mounted bell cranks, one for each coupler and each carrying a coupler on one of its arms; and actuating means engageable with the other arms of the successive bell cranks, to rock the latter and thereby release said couplers from such engagement, to permit the computing wheel driven by the master wheel to turn idly with relation to its gear.

10. The combination with a series of composite computing wheels, each computing wheel comprising two relatively-movable parts, a carry-over train from one part of one wheel to the other part of the next wheel, an integral coupling wheel meshing directly with both parts of each composite computing wheel, and automatic means for lifting solely one of said coupling wheels out of mesh with its accordant composite computing wheel at one time.

11. The combination with a series of composite computing wheels, each computing wheel comprising two relatively-movable parts, a carry-over train from one part of one wheel to the other part of the next wheel, an integral coupling wheel meshing directly with both parts of each composite computing wheel, a shifter for each of said coupling wheels, and a single cam roller engaging said shifters individually and *seriatim* to disengage the corresponding coupling wheel from the parts of the associated composite computing wheel, so as to leave both parts free to move relatively.

12. The combination with a series of dial wheels, of a master wheel for driving said dial wheels *seriatim*, a series of computing wheels corresponding individually to said dial wheels, an intermediate gear for every pair of a computing wheel and a dial wheel, said intermediate gears meshing with both the dial wheel and the accordant computing wheel, so that the one may drive the other, said master wheel being arranged to engage said intermediate gears so as to simultaneously rotate a dial wheel and a computing wheel of a pair, each of said computing wheels being composite and comprising a pair of relatively-movable parts, a carry-over mechanism operatively meshing with one part of one computing wheel and with the other part of the next adjacent computing wheel, an integral coupling wheel meshing externally with both parts of each composite wheel, so as to join the parts of the computing wheels individually, and means for moving said coupling wheels individually out of mesh with the corresponding composite computing wheel.

13. The combination with a series of computing wheels including a units wheel, of a master wheel for driving said computing wheels *seriatim*, a carry-over mechanism between each wheel and the next higher wheel, said units wheel being composite and comprising a fixed gear and a loose gear, an integral coupling gear meshing directly with said fixed gear and said loose gear to lock said units wheel against rotation, means for maintaining said coupling gear normally in mesh with the parts of said units wheel, and releasing means for removing said coupling gear from mesh with said units wheel when said master wheel is in register with said units wheel.

14. In a combined typewriting and computing machine, the combination with a series of computing wheels, of a traveling carriage, a master wheel for sucessively driving said computing wheels, a carry-over mechanism comprising integral Geneva lock wheels each extending from one computing wheel to the next, forming a complete train between said computing wheels, a loose gear associated with each computing wheel, a coupling gear for each computing wheel and its associated gear normally engaged therewith, so as to cause them to revolve as a unit, and means carrying said coupling gears controlled by said carriage for moving them *seriatim* to ineffective position for unlocking each Geneva lock individually when its computing wheel is driven by said master wheel.

15. In a combined typewriting and computing machine, the combination with a series of computing wheels, and a traveling carriage carrying them, of a master wheel for successively driving said computing wheels, a loose gear associated with each computing wheel, a carry-over mechanism comprising integral wheels forming a locking train with said computing wheels so that each wheel is normally locked from the one below, each carry-over wheel having teeth constantly engaging the loose gear above, and also having other carry-over teeth engaging the computing wheel below, couplers for coupling said computing wheels to their loose gears, to form single wheels, and means on the machine frame for shifting the successive couplers individually to ineffective position.

16. The combination, with a plurality of computing wheels, a loose transfer member associated with each computing wheel and disposed co-axially therewith, and a master wheel for driving said computing wheels; of a carry-over mechanism for driving said transfer members; an integral coupler individual to each computing wheel and its associated transfer member, arranged to directly engage both of them, so as to lock them together in unison, said couplers normally held in such engagement; and automatic means for moving the successive couplers bodily, one after another, out of such engagement, to permit the computing wheel driven by the master wheel to turn idly with relation to its transfer member.

17. The combination, with a traveling element, and a series of wheels carried thereby, each wheel comprising a pair of relatively-rotatable co-axial members disposed face to face; of a series of integral couplers, one for each wheel normally engaged with the members thereof, to lock the same together for rotation in unison, said couplers carried by said element to travel therewith; and a single stationary releasing device for moving the successive couplers bodily, one after another, out of such engagement, as the travel of said element proceeds.

18. The combination, with a traveling element, and a series of wheels carried thereby, each wheel comprising a pair of relatively-rotatable co-axial members disposed face to face; of a series of integral couplers, one for each wheel normally engaged with the members thereof, to lock the same together for rotation in unison, said couplers carried by said element to travel therewith; and a stationary cam for moving the successive couplers bodily, one after another, out of such engagement, as the travel of said element proceeds.

WALTER WRIGHT.

Witnesses:
C. Ripley,
J. Levy.

Copies of this patent may be obtained for five cents each, by addressing the "Commissioner of Patents, Washington, D. C."